United States Patent
Sung et al.

(10) Patent No.: US 11,770,766 B2
(45) Date of Patent: **\*Sep. 26, 2023**

(54) POWER MANAGEMENT OF SECONDARY NODE BASED ON NETWORK CONDITIONS

(71) Applicant: T-Mobile Innovations LLC, Overland Park, KS (US)

(72) Inventors: Sanghoon Sung, Ashburn, VA (US); Tri Duong, Annandale, VA (US); Hau Tran, Centreville, VA (US); Minho Song, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,923

(22) Filed: Sep. 6, 2022

(65) Prior Publication Data
US 2022/0417848 A1    Dec. 29, 2022

Related U.S. Application Data

(63) Continuation of application No. 16/793,927, filed on Feb. 18, 2020, now Pat. No. 11,463,950.

(51) Int. Cl.
*H04W 52/02* (2009.01)
*H04W 76/15* (2018.01)

(52) U.S. Cl.
CPC ....... *H04W 52/0206* (2013.01); *H04W 76/15* (2018.02)

(58) Field of Classification Search
CPC ................. H04W 52/0206; H04W 76/15

USPC ................................................... 370/311
See application file for complete search history.

(56) References Cited

U.S. PATENT DOCUMENTS

| | | |
|---|---|---|
| 2016/0037426 A1 | 2/2016 | Li |
| 2017/0071007 A1 | 3/2017 | Wang et al. |
| 2019/0387569 A1 | 12/2019 | Martinez Tarradell et al. |
| 2021/0045177 A1 | 2/2021 | Lee et al. |
| 2021/0226756 A1 | 7/2021 | Zhu |

OTHER PUBLICATIONS

Antonioli, R. P. et al., "Dual Connectivity for LTE-NR Cellular Networks", XXXV Simposio Brasileiro De Telecomunicacoes, pp. 171-175 (Sep. 2017).

*Primary Examiner* — Gbemileke J Onamuti
(74) *Attorney, Agent, or Firm* — SHOOK, HARDY & BACON L.L.P.

(57) ABSTRACT

Systems and methods are provided for managing the power of a secondary node in an E-Utran/New Radio Dual Connectivity (ENDC) configured wireless communication network. In response to determining that one or more transmission blocking conditions have been met, a master node communicates an instruction to the secondary node via a data connection cable or an X2 logical interface to not transmit downlink signals, reducing overall power network power consumption and inter-nodal inference when ENDC resources are not required.

20 Claims, 4 Drawing Sheets

POWER MANAGEMENT OF SECONDARY NODE BASED ON NETWORK CONDITIONS

CROSS-REFERENCE TO RELATED APPLICATIONS AND PRIORITY CLAIM

This application is a continuation of U.S. patent application Ser. No. 16/793,927, filed Feb. 18, 2020, and entitled power management of secondary node based on network conditions, the entirety of which is hereby incorporated by reference.

SUMMARY

The present disclosure is directed, in part, to managing the power of a secondary node in a wireless communication network based on one or more network conditions, substantially as shown in and/or described in connection with at least one of the figures, and as set forth more completely in the claims.

According to various aspects of the technology, one or more transmissions of a secondary node are blocked when one or more conditions are satisfied in order to conserve power and reduce unnecessary interference. Some modern wireless communication networks, particularly wireless telecommunication networks, utilize E-UTRAN New Radio Dual Connectivity (ENDC). A secondary node in a conventionally co-located ENDC system always transmits certain signals such as synchronization signal block (SSB) and various reference signals, without regard to whether the transmission of said signals is actually necessary, based on various network conditions. By blocking the transmission of signals by the secondary node, under certain conditions, less power is used by the ENDC system and interference caused by the secondary node is reduced or eliminated.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
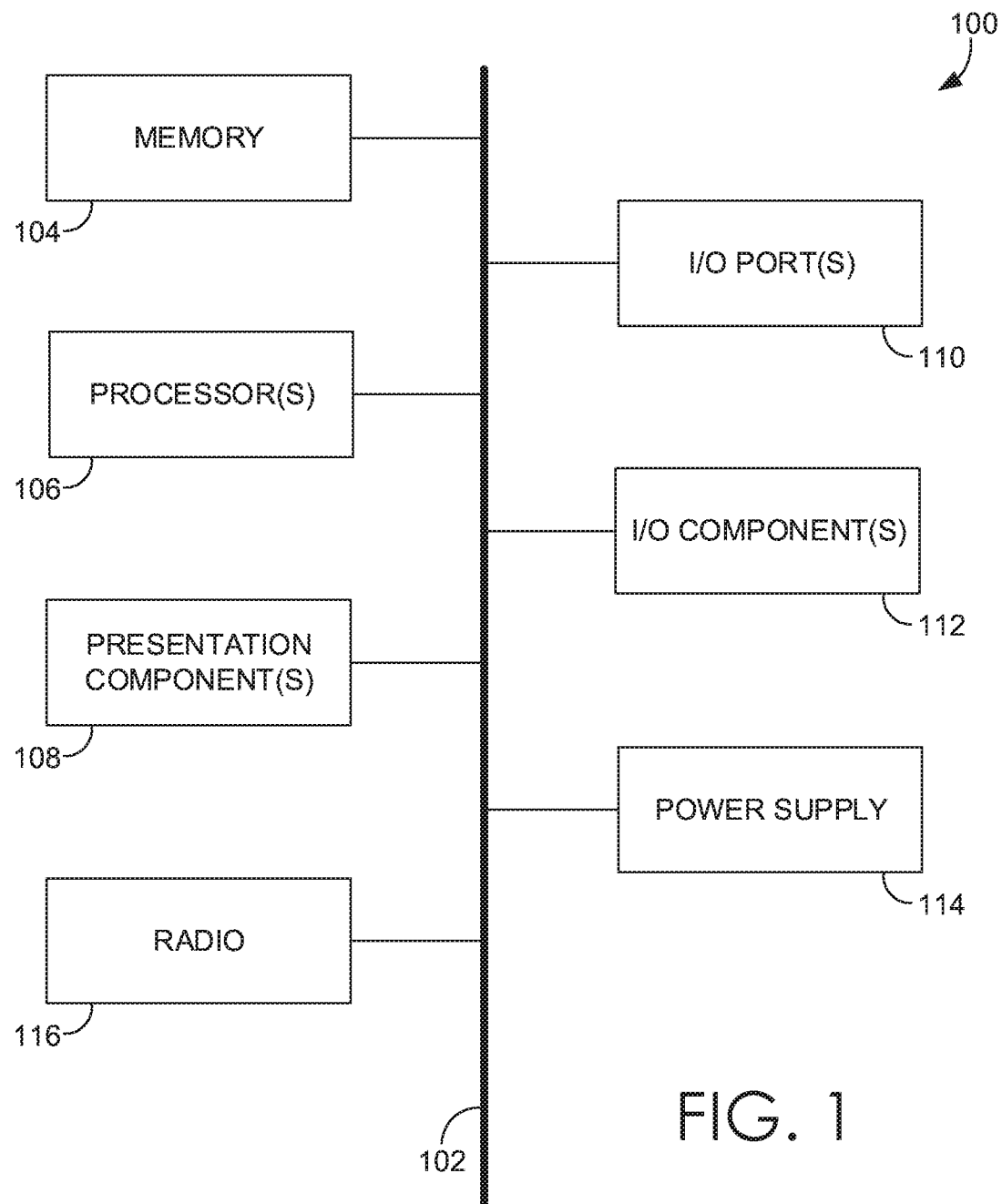
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network employs one or more base stations to provide wireless access to a network. For example, in a wireless telecommunication network, a plurality of access points, each providing service for a cell or a sector of a cell, are used to transmit and receive wireless signals to/from one or more UEs. An access point may be considered to be one or more otherwise-discrete components comprising an antenna, a radio, and/or a controller, and may be alternatively referred to as a "node," in that it is a point of origin for the communication link between the wired and wireless portions of the communication system. In aspects, a node may be defined by its ability to communicate with a UE according to a single protocol (e.g., 3G, 4G, LTE, 5G, and the like); however, in other aspects, a single node may communicate with a UE according to multiple protocols.

Some modern networks are configured for E-UTRAN New Radio Dual Connectivity (ENDC). That is, the network may provide two or more discrete downlink channels to communicate with a single UE. When ENDC is configured in a network, it generally may be said to take the form of a master node and a secondary node. Conventionally, both the master node and the second node regularly transmit a variety of downlink signals that are used prior to, during, and after a communication session with a UE. These downlink signals may include, but are not limited to, synchronization signal block(s) (SSBs) and reference signals (e.g., channel state information reference signal (CSI-RS), tracking reference signal (TRS), interference measurement channel state information reference signal (IM-CSI-RS), sounding reference signal (SRS), and a demodulation reference signal (DRS)).

Special hardware, firmware, and or software is required on a UE in order to utilize ENDC features of the network. Therefore, not every UE is capable of utilizing ENDC. Particularly as UEs are phased in to utilize ENDC in the transition from LTE to 5G, it is highly likely that network infrastructure evolution may outpace UE utilization. So, when one or more of the downlink signals transmitted by an ENDC node (e.g., a secondary node) and no UE in the corresponding coverage sector is configured for ENDC, the downlink signal is not used for any beneficial purpose. The amount of energy and network resources used to transmit the signal is wasted. Further, unnecessarily transmitted downlink signals, particularly by a secondary node, may create interference observed by the master node (in the same sector as the secondary node), or by nodes in a different sector.

As such, the present disclosure is directed to methods, systems, and computer readable media that manage the power of a secondary node in a dual connectivity network. By reducing or eliminating downlink transmissions of a secondary node when they are not needed, the wireless network will benefit by using less energy and may reduce inter-node (external) interference—all while users of the wireless network experience little or no negative effects on coverage or throughput.

As used herein, the terms "master node" and/or "secondary node" may be specific nodes, base stations, or access points, that can be considered to be discrete from one another. While a mater node or secondary node may be referred to herein with respect to its protocol, it should be understood that any particular master node or secondary node may be capable of operating in any one or more of any suitable wireless communication protocol. It should also be understood that a master node and a secondary node may take various operational forms; for example, a master node may be a macro cell and an secondary node may be a small cell, or vice versa. The terms "user device," "user equipment," "UE," "mobile device," "mobile handset," and "mobile transmitting element" may be used interchangeably in this description.

Accordingly, a first aspect of the present disclosure is directed to a system for managing power consumption of a secondary node in a dual connectivity wireless network. The system comprises a first node, the first node configured to communicate with a user device using a first wireless communication protocol. The system further comprises a second node, a second node configured to communicate with the user device using a second wireless communication protocol. The system further comprises one more processors, wherein the one or more processors configured to perform operations comprising determining that one or more transmission blocking conditions has been met, and instructing the second node not to transmit a signal for a predetermined period of time.

A second aspect of the present disclosure is directed to a method for managing transmission power of a secondary node in an ENDC-configured network. The method comprises determine that one or more transmission blocking conditions has been met. The one or more transmission blocking conditions comprises a determination that no user devices connected to a master node are configured for E-UTRAN New Radio Dual Connectivity (ENDC). The method further comprises instructing the secondary node not to transmit a signal for a predetermined period of time.

According to another aspect of the technology described herein, one or more computer-readable media is provided having computer-executable instructions embodied thereon that, when executed, perform a method for managing transmission power of a secondary node in an ENDC-configured network. The method comprises determine that one or more transmission blocking conditions has been met. The one or more transmission blocking conditions comprises a determination that no user devices connected to a master node are configured for E-UTRAN New Radio Dual Connectivity (ENDC). The method further comprises instructing the secondary node not to transmit a signal for a predetermined period of time.

Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
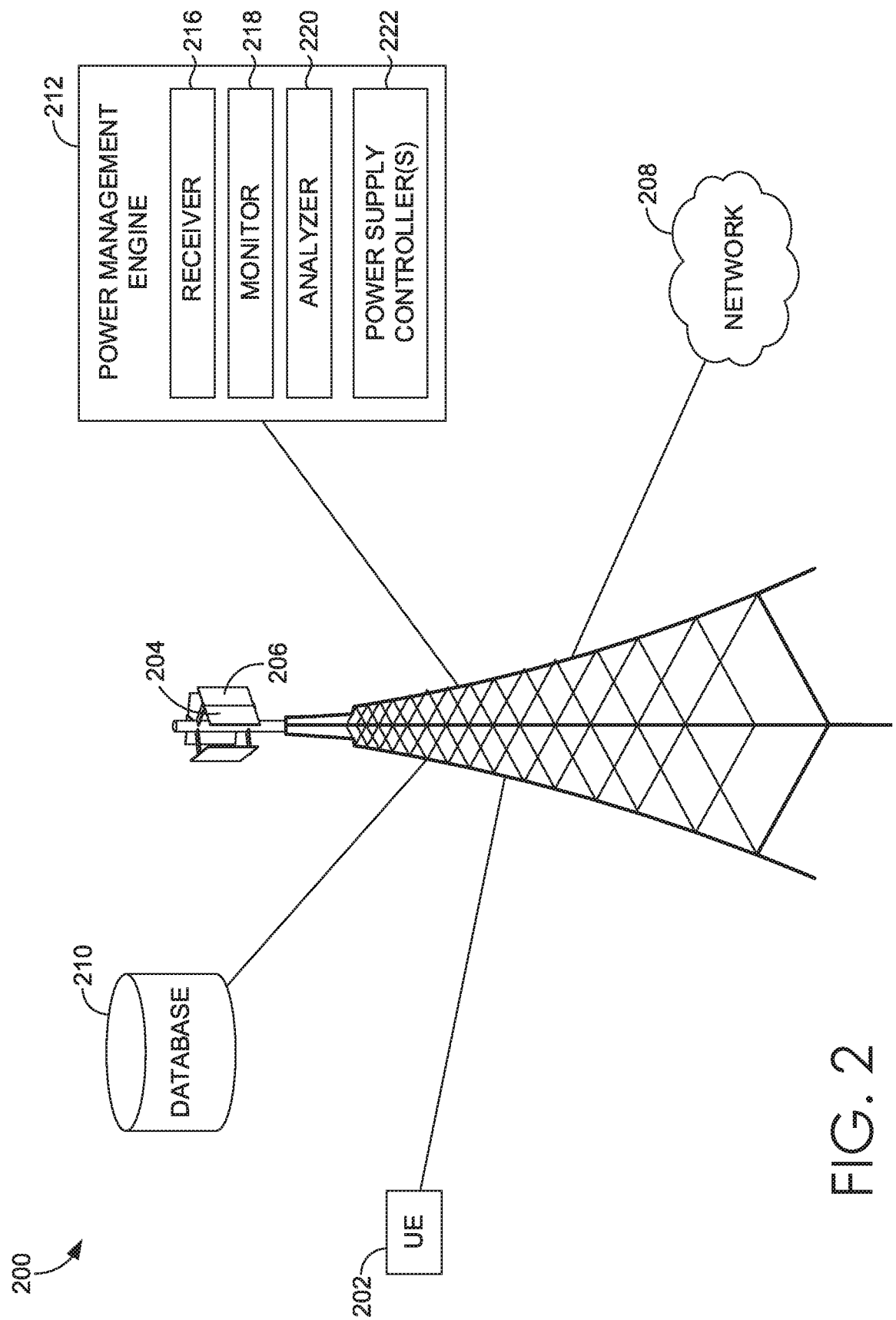
FIG. 2 illustrates a diagram of an exemplary network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user device 202, a first node 204, a second node 206, network 208, database 210, and dynamic power allocation engine 212. In network environment 200, the user device 202 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with one or more of the first node 204 and the secondary node 206 in order to interact with one or more components of the network 208.

In some aspects, the user device 202 can correspond to computing device 100 in FIG. 1. Thus, a user device can include, for example, a display(s), a power source(s) (e.g., a battery), a data store(s), a speaker(s), memory, a buffer(s), a radio(s) and the like. In some implementations, the user device 202 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. In aspects relevant to the present disclosure, the user device 202 may be configured for ENDC, that is, the user device 202 may be configured to utilize two or more channels to communicate simultaneously (or nearly simultaneously) with two or more nodes of the wireless network. Though ENDC communication typically utilizes at least two different wireless protocols (e.g., LTE, 5G), the present disclosure is agnostic as to the wireless protocols being used to communicate between the wireless network and the user device 202. Specifically, the wireless link(s) between the user device and each of the first node 204 and the second node 206 may take place according to any desirable wireless communication protocol.

In some cases, the user device 202 in network environment 200 can optionally utilize network 208 to communicate with other computing devices (e.g., a mobile device(s), a server(s), a personal computer(s), etc.) through one or more of the first node 204 and the second node 206. The network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure.

Network 208 can be part of a telecommunication network that connects subscribers to their immediate service provider. In some instances, network 208 can be associated with a telecommunications provider that provides services (e.g., voice, data, SMS) to user devices, such as user device 202. For example, network 208 may provide voice, SMS, and/or data services to user devices or corresponding users that are registered or subscribed to utilize the services provided by a telecommunications provider. Network 208 can comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, each of the first node 204 and the second node 206 are configured to communicate with user devices, such as the user device 202 that are located within the geographical area, or cell, covered by the one or more antennas of each of the first node 204 and the second node 206. Though referred to nodes for simplicity, each of the first node 204 and the second node 206 may include one or more base stations, nodes, base transmitter stations, radios, antennas, antenna arrays, power amplifiers, transmitters/receivers, digital signal processors, control electronics, GPS equipment, and the like. In particular, and for the purposes of this disclosure, the user device 202 may be characterized by whether or not it is configured for ENDC. If the user device 202 is not configured for ENDC, then the user device 202 is likely configured to only communicate with a single access point, or node, such as the first node 204. If the user device 202 is configured for ENDC, then the user device 202 is configured to communicate with two or more access points, or nodes, according to one or more wireless communication protocols on two or more downlink (and/or uplink) channels in order to access the network 208. In some instances, the first node 204 may be referred to as a master node and the second node 206 may be referred to as a secondary node in an ENDC-configured network.

Though an ENDC session may take many forms, it is generally recognized that an ENDC-configured user device enters an ENDC session (used herein to refer to a period in time in which the same user device wirelessly communicates with two or more discrete nodes) when a request is made to communicate with a secondary node in addition to the master node, with which the user device was already in communication. In one aspect, this ENDC session request may originate by the user device; however, the ENDC session request may originate at the master node, a service gateway (SGW), authentication, authorization, and accounting server (AAA server), mobility management entity (MME), or any other desirable entity/location/component. If it is determined that the ENDC-configured user device should have a second connection, then one or more components of the wireless network may perform a node addition procedure. For example, an ENDC session may be created when one or more components of the wireless network receives an indication that the user device 202 is configured for ENDC. In response, the wireless network may initiate/maintain a connection between the user device 202 and the first node 204 (e.g., master node, such as a master eNodeB (MeNB)) as a first connection (e.g., using 4G/LTE protocol). Subsequent to the first connection being completed with the first node 204 may initiate a series of communications with the second node 206 via a physical connection or x2 logical interface that effectively control an addition procedure wherein a second connection, between the user device 202 and the second node 206 (e.g., secondary node, such as a secondary gNodeB (SgNB)) is established. Once the ENDC session is completed, the first node 204 may similarly communicate with the second node 206 to effectively control a secondary node release procedure.

One or more of the first node 204 and the second node 206 may be in communication with a power management engine 212, which comprises various components that are utilized, in various implementations, to perform one or more methods for managing power usage by the secondary node of an ENDC-configured wireless network. In some implementations, such as the one depicted in FIG. 2, the power management engine 212 comprises components including a receiver 216, a monitor 218, an analyze 220, and a power supply controller 222. However, in other implementations, more or less components than those shown in FIG. 2 may be utilized to carry out aspects of the invention described herein. Though shown as a separate entity, the power management engine 212 may take the form of one or more software stacks, modules, applications, etc., may be executed and/or located at a single location or a plurality of locations, and may executed by one or more network components, such as the first node 204, which may take the form of a MeNB.

The receiver 216 of the power management engine 212 is generally responsible for receiving information from user devices (and/or from one or more components of network 208) that is relevant to making a power management determinations. The receiver 216 may receive an indication that one or more user devices is connected to the master node 204. The receiver may further receive an indication from each of the one or more user devices as to whether or not each user device is configured for (or capable of) ENDC. The receiver 216 may further be configured to determine if any of the one or more user devices is in a pre-existing ENDC session or is otherwise already connected to the secondary node 206. The receiver 216 may communicate said information to one or more of the monitor 218, the analyzer 220, or the power supply controller 222. The monitor 218 of the power management engine 212 is generally responsible for monitoring the channel resource utilization ratio of the first node 204. For the purposes of this disclosure, the channel resource utilization ratio may be considered to be a ratio of a particular channel's utilization and the channel's capacity over a predetermined time period. In another aspect, the monitor 218 may monitor the quantity of user devices that are connected to the first node 204. The monitor 218 may communicate said information to one or more of the analyzer 220 and the power supply controller 222.

The analyzer 220 is generally responsible for making power management determinations based on one or more transmission blocking conditions being met. In one aspect, the analyzer 220 may receive an indication from the receiver 216 that, of all of the user devices connected to the first node 204, none of the user devices are configured for, or capable of, ENDC. Accordingly, the analyzer may determine that there is no need for the second node 206 to transmit a downlink signal (e.g., SSB or references signals) and communicate a transmission blocking instruction to the power supply controller 222 that, when carried out, would prevent/stop the second node 206 from transmitting one or more downlink signals for a predetermined time period. In another aspect, the analyzer 220 may additionally or alternatively receive an indication from the monitor 218 regarding the channel utilization ratio of the first node 204. The analyzer may compare the channel utilization ratio of the first node 204 to determine if it exceeds or does not exceed a predetermined threshold. The predetermined threshold may be any desirable threshold to reduce, mitigate, or prevent any coverage/speed degradations that may be experienced by users associated with user devices served by the first node 204 (or to reduce, mitigate, or prevent network congestion). In a similar aspect, the analyzer 220 may receive an indication from the monitor 218 that a quantity of user devices connected to the first node exceeds a predetermined threshold. If the analyzer 218 determines that one or more transmission blocking conditions have been met, the analyzer has effectively determined that there is no need for the second node 206 to transmit one or more downlink signals during a predetermined time period and may communicate a transmission blocking instruction to the power supply controller 222.

The power supply controller 222 is generally responsible for adjusting the one or more power supplies as determined by the analyzer 218. The power supply controller 222 may modify the operations of the second node 206, or facilitate the communication of a transmission blocking instruction to the second node 206. Though depicted as a module/element of the power management engine 212, it is expressly conceived that the power supply controller(s) 222 may be, or may be a component of, the second node 206, itself.

Figure 3:
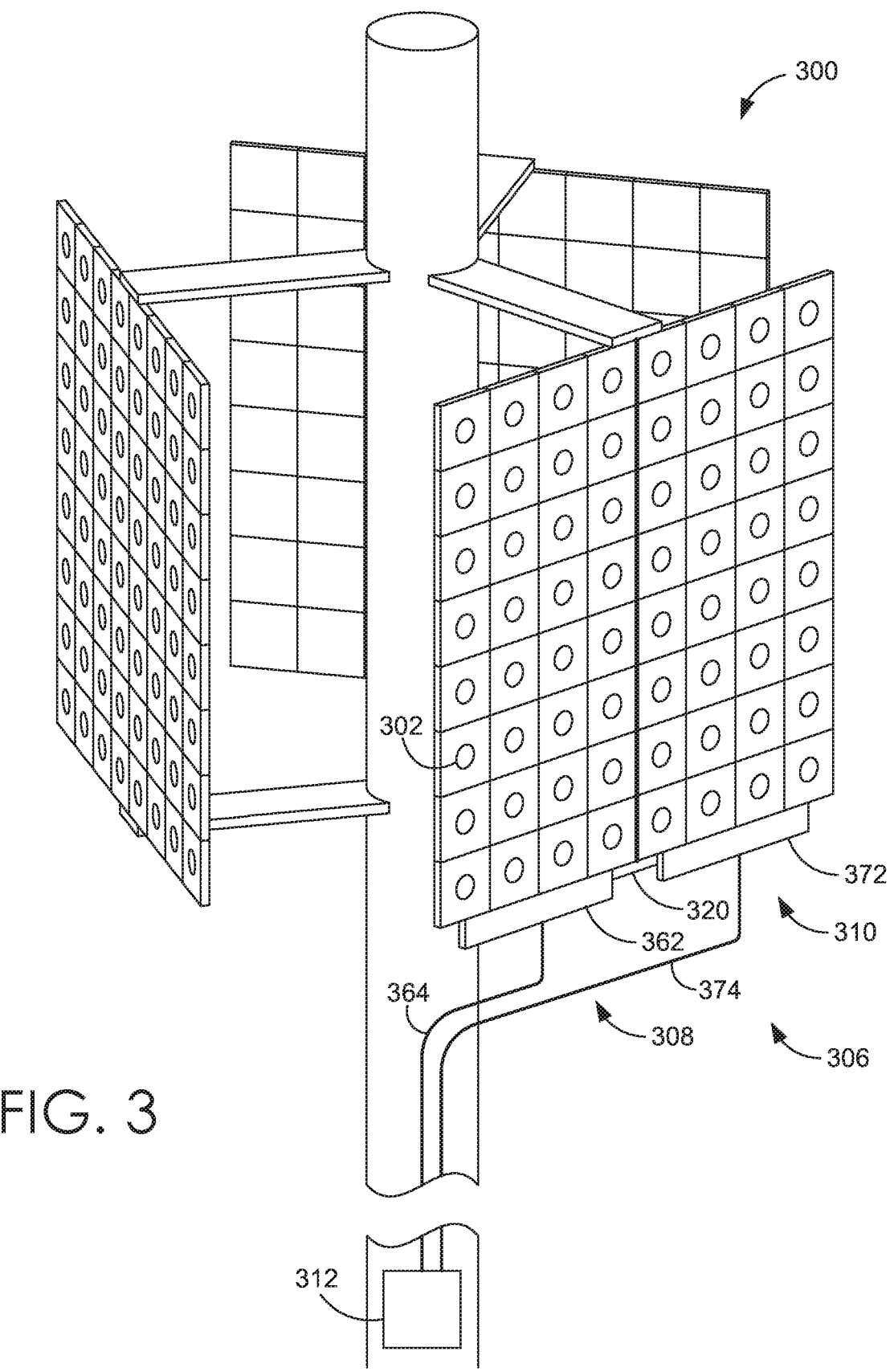
FIG. 3 depicts a graphical representation of a base station configuration suitable for use in embodiments of the present disclosure.

Turning now to FIG. 3, an exemplary base station configuration suitable for use in implementing embodiments of the present disclosure is illustrated and designated generally as base station 300. Base station 300 is but one example of a suitable configuration and is not intended to suggest any limitations as to the scope of use or functionality of embodiments described herein. Neither should the configuration be interpreted as having any dependency or requirement relating to any one or combination of components illustrated.

Base station 300 comprises at least a first antenna array 306, the first antenna array 306 having one or more antennas 302. In aspects, the antenna array may be an active antenna array, FD-MIMO, massive MIMO, 3G, 4G, 5G, and/or 802.11. In aspects, the first antenna array 306 may comprise a first node 308 and a second node 310. The first node 308 and the second node 310 may each communicate with one or more user devices according to a distinct protocol (i.e., the first node is configured to communicate with UE according to a first wireless communication protocol and the second node is configured to communicate with UE according to a second wireless communication protocol). By way of non-limiting example, each of the first protocol and the second protocol may comprise 3G, 4G, LTE, 5G, 802.11, or any other operator-elected wireless communication protocol standard. As used in an ENDC-configured network, the first node 308 may be considered a master node (e.g., a master eNodeB (MeNB)) and the second node 310 may be considered a secondary node (e.g., a secondary gNodeB (SgNB)). In the aspect shown in FIG. 3, the first node 308 and the second node 310 are geographically co-located; that is, they are physically disposed at the same tower, cell, site, or the like. Though not depicted in FIG. 3, it is expressly conceived that the first node 308 and the second node 310 may not be geographically co-located, and may instead be disposed at two geographically discrete locations.

In some aspects, the first node 308 may be said to comprise a first radio (e.g., remote radio head) and a first baseband unit (BBU) 362. The second node 310 may similarly be said to comprise a second radio and a second baseband unit 372. The first radio and the second radio may be the same radio (e.g., if the nodes are co-located) or may be discrete radios. The respective radios may be connected to their respective baseband units via one or more front haul interfaces. The first baseband unit 362 may be connected via a BBU connection 320 to the second baseband unit 372 via one or more hardwired (i.e., physical) data connection cables or the BBU connection 320 may take the form of an X2 logical interface, wherein each of the first BBU 362 and the second BBU 372 are assigned a network identifying address (e.g., IP address) and wherein communications are exchanged via the wireless network.

The base station 300 may further comprise a processor 312. The processor 312 may be any one or more processors, servers, computer processing components, or the like, wherein the processor 312 is configured to perform any one or more operations of the power management engine 212 of FIG. 2. In some aspects, the processor 312 may be communicatively coupled to each of the first node 308 and the second node 310. As discussed with respect to the power management engine 212 of FIG. 2, the processor 312 of FIG. 3 may make power management decisions based on any one or more transmission blocking conditions being met. Though depicted as a discrete processor, the processor 312 may be communicatively coupled to, or may be, in part or in whole, the first node 308 (i.e., the master node).

Figure 4:
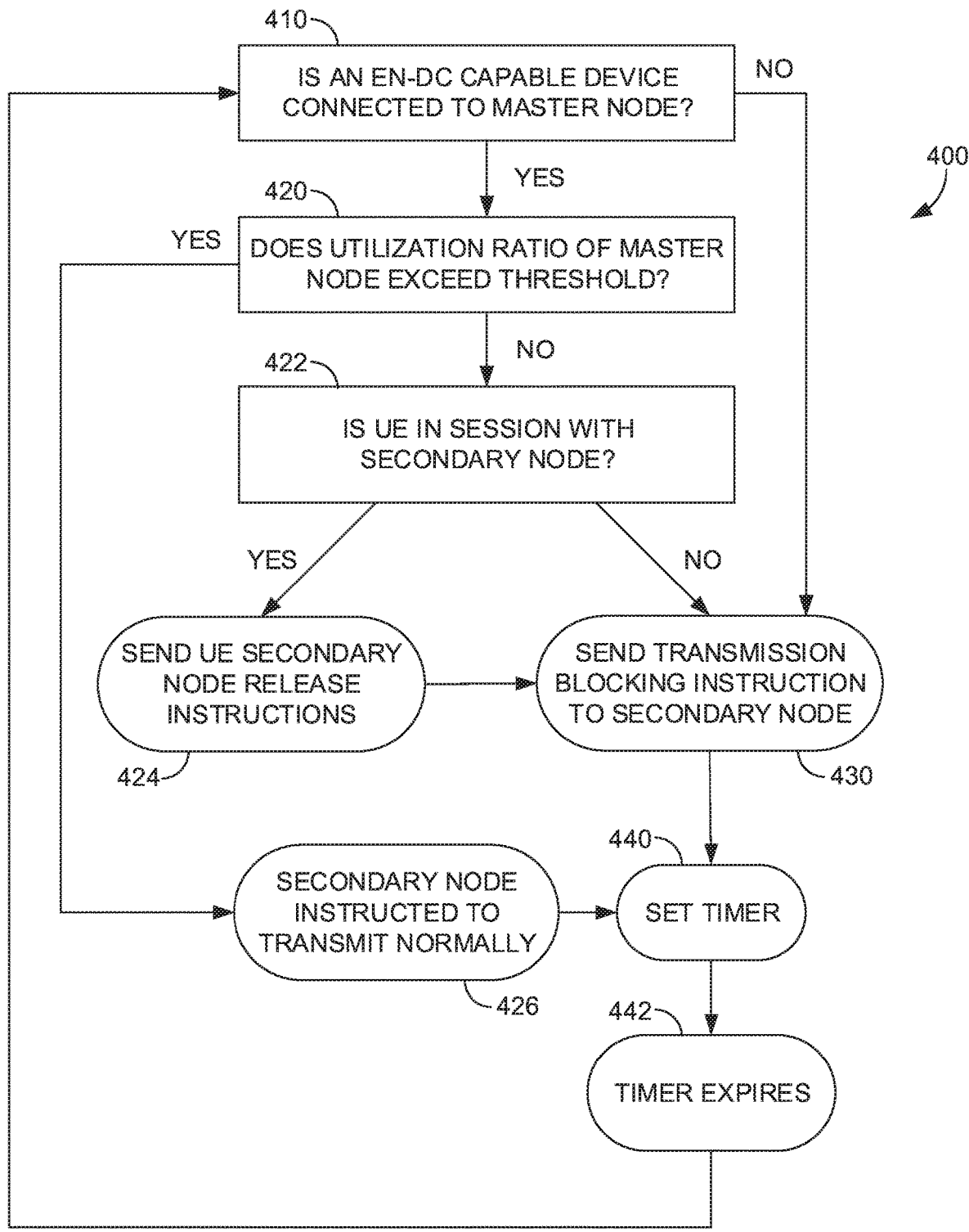
FIG. 4 depicts a flow diagram of an exemplary method for uplink channel power management by a wireless communication network, in accordance with implementations of the present disclosure.

FIG. 4 depicts a flow diagram of an exemplary method 400 for instructing a managing transmission power of a secondary node in an ENDC-configured wireless communication network. At step 410, the first of one or more transmission blocking triggers is considered. Specifically, at step 410, one or more components of the wireless communication network determines whether or not any ENDC-capable devices are connected to a master node. If no user devices are connected to the master node that are even capable of ENDC, there is no need for the secondary node to transmit downlink signals (e.g., SSBs, and/or various reference signals). Accordingly, if this condition is met, the method proceeds to step 430, wherein one or more components of the network (e.g., the master node) instructs the secondary node to not transmit any downlink signals. Such an instruction may be referred to herein as a "transmission blocking instruction."

If at least one use device is connected to the master node that is capable of ENDC, the method proceeds to step 420. At step 420, a second transmission blocking trigger is considered. Specifically, at step 420, one or more components of the network (e.g., the mater node) determines whether a channel utilization ratio exceeds a predetermined threshold, wherein the channel utilization ratio is a ratio of channel utilization to channel capacity over a predetermined time period. The predetermined threshold of step 420 may be any desirable threshold to avoid, reduce, or mitigate user-realized speed/service degradations or network congestion. For example, the predetermined threshold could be in a range of 25-80%, for example, 50%. If the channel utilization ratio does exceed the predetermined threshold, the method proceeds to step 426, wherein the secondary node is not provided with any transmission blocking instruction and is permitted to operate in a normal/conventional ENDC mode. Conversely, if the channel utilization ratio does not exceed the predetermined threshold, the method proceeds to step 420. At step 420, one or more network components (e.g., the master node) determines if a particular user device is in a pre-existing ENDC session or is otherwise connected to the secondary node in addition to being connected to the master node. If so, the method 400 calls for the connection to the secondary node to be terminated because sufficient capacity exists to handle the particular user device's traffic at the master node, alone. Accordingly, at step 424, one or more components of the network (e.g., the master node) instructs the secondary node to release (i.e., disconnect) the particular user device from the secondary node.

Once the particular user device has been disconnected from the secondary node (or if no user devices were connected to the secondary node at step 422), the method 400 proceeds to step 430. Whether the secondary node has been instructed to not transmit downlink signals at step 430 or permitted to operate in a normal ENDC mode at step 426, aspects of method 400 proceed to step 440, wherein a predetermined timer is set. The timer may be set for any desirable time period, for example, the timer may be set in the range of 1-30 minutes, for example the timer may be set for 1, 5, 10, or 15 minutes. Once the timer expires at step 442, the method 400 may repeat. Method 400 is but one specific example of a suitable method; it is specifically envisioned that a suitable method may not comprise step 410. Yet another suitable method may not comprise steps 420, 422, 424, and 426.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for managing power of a secondary node in a dual connectivity wireless network, the system comprising:
   a first node configured to communicate with a user device;
   a second node configured to communicate with the user device; and
   one more processors configured to perform operations comprising:
      determining that one or more user devices are connected to each of the first node and the second node in dual connectivity session;
      determining that a channel resource utilization of the first node does not exceed a predetermined threshold, the channel resource utilization being a ratio of channel utilization to channel capacity during a predetermined period of time;

in response to said determinations, terminating a connection between each of the one or more user devices and the second node; and instructing the second node not to transmit a signal for a predetermined period of time.

2. The system of claim 1, wherein the first node comprises a master eNodeB (MeNB).

3. The system of claim 2, wherein the second node comprises a secondary gNodeB (SgNB).

4. The system of claim 1, wherein the dual connectivity session comprises an E-UTRAN New Radio Dual Connectivity (ENDC) session.

5. The system of claim 1, wherein the first node comprises a first radio unit and a master node baseband unit configured to communicate with the user device according to a first wireless communications protocol, and the second node comprises a second radio unit and a secondary node baseband unit configured to communicate with the user device according to a second wireless communication protocol.

6. The system of claim 5, wherein the first wireless communication protocol is an LTE protocol and the second wireless communication protocol is a 5G protocol.

7. The system of claim 5, wherein the first radio unit and the second radio units are a common radio unit and wherein the first baseband unit is coupled to the second baseband unit by one or more data connection cables.

8. The system of claim 7, wherein each of the first node and the second node are geographically co-located.

9. The system of claim 5, wherein the first radio unit and the second radio unit are different radio units, and wherein the first baseband unit is coupled to the second baseband unit by an X2 logical interface.

10. The system of claim 9, wherein the first node is located at a first geographic location and the second node is located is located at a second geographic location, the first geographic location being different than the second geographic location.

11. The system of claim 1, wherein the one or more transmission blocking conditions comprises a determination that, subsequent to terminating the condition between each of the one or more user devices and the secondary node, no user devices are connected to the second node.

12. A method for managing power of a secondary node in a dual connectivity wireless network, the method comprising:

determining that one or more user devices are connected to each of a first node and a second node in dual connectivity session;

determining that a channel resource utilization of the first node does not exceed a predetermined threshold, the channel resource utilization being a ratio of channel utilization to channel capacity during a predetermined period of time;

in response to said determinations, terminating a connection between each of the one or more user devices and the second node; and instructing the second node not to transmit a signal for a predetermined period of time.

13. The method of claim 12, wherein the first node comprises a master eNodeB (MeNB).

14. The method of claim 13, wherein the second node comprises a secondary gNodeB (SgNB).

15. The method of claim 14, wherein the dual connectivity session comprises an E-UTRAN New Radio Dual Connectivity (ENDC) session, and wherein the first node is configured to communicate with a user device using a first wireless communication protocol and the second node is configured to communicate with the user device using a second wireless communication protocol.

16. The method of claim 12, wherein the one or more transmission blocking conditions comprises a determination that, subsequent to terminating the condition between each of the one or more user devices and the secondary node, no user devices are connected to the second node.

17. A non-transitory computer storage media storing computer-usable instructions that, when used by one or more processors, cause the one or more processors to:

determine that one or more transmission blocking conditions has been met, the one or more transmission blocking conditions comprising a determination that a channel resource utilization of a master node does not exceed a predetermined threshold, the channel resource utilization being a ratio of channel utilization to channel capacity during a predetermined period of time; and instructing the secondary node not to transmit a signal for a predetermined period of time.

18. The non-transitory computer readable media of claim 17, wherein the master node is configured to communicate with a user device using a first wireless communication protocol and the secondary node is configured to communicate with the user device using a second wireless communication protocol.

19. The non-transitory computer readable media of claim 18, wherein one or more processors are further caused to terminate a connection between the user devices and the second node.

20. The non-transitory computer readable media of claim 19, wherein one or more processors are further caused to determine that, subsequent to terminating the condition between the user device and the second node, no user devices are connected to the second node.

* * * * *